United States Patent [19]
Moelard et al.

[11] Patent Number: 5,371,738
[45] Date of Patent: Dec. 6, 1994

[54] WIRELESS LOCAL AREA NETWORK SYSTEM WITH MOBILE STATION HANDOVER

[75] Inventors: Hendrik Moelard, Maarssen; Leo Monteban, Nieuwegein, both of Netherlands

[73] Assignee: NCR Corporation, Dayton, Ohio

[21] Appl. No.: 69,037

[22] Filed: May 28, 1993

[30] Foreign Application Priority Data

Dec. 12, 1992 [GB] United Kingdom ............... 9226707

[51] Int. Cl.⁵ .................... H04Q 7/04; H04B 7/26; H04J 3/14
[52] U.S. Cl. ........................... 370/85.1; 370/95.1; 455/33.2; 455/54.2; 455/56.1; 379/60
[58] Field of Search ............... 370/95.1, 95.2, 95.3, 370/85.1; 455/33.1, 33.2, 33.3, 53.1, 54.1, 54.2, 56.1; 379/58, 59, 60, 63

[56] References Cited

U.S. PATENT DOCUMENTS

| | | | |
|---|---|---|---|
| 5,046,066 | 9/1991 | Messenger | 370/94.1 |
| 5,276,680 | 1/1994 | Messenger | 370/95.1 |
| 5,278,835 | 1/1994 | Ito et al. | 370/95.1 |

FOREIGN PATENT DOCUMENTS

| | | |
|---|---|---|
| 0479477 | 9/1991 | European Pat. Off. |
| 0474489 | 3/1992 | European Pat. Off. |
| 0483544 | 5/1992 | European Pat. Off. |
| 0483546 | 5/1992 | European Pat. Off. |
| 0483551 | 5/1992 | European Pat. Off. |
| 9219059 | 10/1992 | WIPO |

Primary Examiner—Douglas W. Olms
Assistant Examiner—Min Jung
Attorney, Agent, or Firm—James M. Stover

[57] ABSTRACT

A local area network system (10) includes a wired backbone LAN (12) having a plurality of LAN segments (14, 16, 18) interconnected by transparent bridges (26, 44). A plurality of base stations (22, 52) are capable, of communicating with a mobile wireless station (30). In response to a decision at the mobile wireless station (30) to switch communication from a first base station (22) to a second base station (52) a handover request message (172) is transmitted from the mobile wireless station (30) via the backbone LAN (12) to the first base station (22) thereby updating dynamic filtering databases contained in the base stations (22, 52) and transparent bridges (26, 44) through which the handover request message (172) passes as to the new communication location of the mobile wireless station (30).

9 Claims, 10 Drawing Sheets

WIRELESS LOCAL AREA NETWORK SYSTEM WITH MOBILE STATION HANDOVER

The present invention relates to local area network systems and, more particularly, to a method of operating a local area network system.

BACKGROUND OF THE INVENTION

With a view to obviating the need for wired cabling connections between stations in local area networks (LANs), wireless local area networks have been developed and are now commercially available. However, the coverage area of wireless LANs is restricted especially in an indoor environment, due to the presence of structural features such as walls and floors in buildings, for example. Also, it may be desirable for stations in a wireless LAN to communicate with remote facilities or resources such as servers. Therefore, it has been proposed to connect the wireless LAN via interface devices to a backbone LAN such as a wired LAN, which can be connected to the remote facilities and/or other wireless LANs.

Furthermore, where a mobile wireless station, such as a portable data processing unit provided with a wireless transceiver, for example, moves around it may move in and out of the range of various interface devices connected to the backbone LAN. It is therefore necessary for the backbone LAN to be kept up-to-date as the location of the mobile wireless station, in particular, which interface device is currently in communication with the mobile wireless station.

European Patent Application No. 0,483,544 discloses a wireless communications network including a plurality of mobile data stations in bi-directional communication with header stations which are connected into a wired LAN and which define communication cells. If a mobile data station crosses over from one cell to another, the mobile station determines a new header station for communications access to the wired LAN. The base stations periodically transmit broadcast messages identifying the base station and the loading factors at the base station. Using these messages a mobile station will determine all header stations that are potential owners of the mobile station and maintain in memory a list of potential owner stations. If the current owner station remains a potential owner, and the signal strength of the current owner station is acceptable, then the current owner is retained. Otherwise, the mobile station determines a new header station based on the loading factors of the potential owner stations, and, if the loading factors are equal, the signal strengths of the signals received at the mobile station. The header stations maintain routing tables. When a mobile station determines a new header station as owner, it transmits an uplink message to the new owner. The new header station determines if the mobile station has crossed a cell boundary, that is, the mobile station has a previous, different owner. If so, the new header station sends a message over the wired LAN to the previous owner, which then disowns the identified mobile station. This is a complex procedure.

International Patent Application No. WO 92/19059 discloses a system which includes a cable-based network to which are attached controllers which maintain a portable device in communication with the network for data transfer. The portable unit is registered with a controller by a process which involves transmitting a packet from the portable unit requesting a response from controllers, transmitting a response packet from each controller receiving the request, selecting one of the responding controllers at the portable unit according to criteria that enhance data transfer, and transmitting from the portable unit a packet identifying the selected controller to complete registration. The selected controller transmits a packet confirming the registration to the others via the network cable. The controller with which the portable unit was previously registered responds by de-registering the unit and transmitting any stored packets addressed to the unit via the cable to the newly selected controller. This procedure is also complex.

OBJECT OF THE INVENTION

It is an object of the present invention to provide a local area network wherein the handover of mobile stations from one base station to another is effected in a simple manner which is easy to implement.

SUMMARY OF THE INVENTION

Therefore, according to one aspect of the present invention, there is provided a local area network system including a backbone LAN having a plurality of addressable base stations for respective wireless cells, each base station having a first interface adapted to communicate with said backbone LAN and a second interface adapted to communicate with a mobile wireless station, characterized in that each said base station is adapted to operate as a transparent bridge having a dynamic filtering database; in that, in response to a handover decision at said mobile wireless station to hand over communications from a first cell associated with a first base station to a second cell associated with a second base station, said mobile wireless station is adapted to transmit via said second base station and backbone LAN, a handover request message having the address of said mobile wireless station as a source address and the address of said first base station as a destination address, thereby updating the dynamic filtering databases of said first and second base stations as to the location of said mobile wireless station.

It will be appreciated that in a local area network system according to the invention, the transmission of a handover request message from the mobile station via the new base station and backbone LAN to the old base station automatically effects updating as to the mobile station location in a simple manner.

According to another aspect of the present invention, there is provided a method of operating a local area network system including a backbone LAN having a plurality of addressable base stations adapted to communicate with a mobile wireless station, characterized by the steps of: providing a dynamic filtering database in each said base station identifying the location of said mobile wireless station relative to the base station; deciding at said mobile wireless station to hand over communications from said first base station to a second base station; transmitting from said mobile wireless station a hand over request message to said first base station via said second base station and said backbone LAN; and in response to receipt of said handover request message, updating the dynamic filtering databases in said first and second base stations.

The above and other objects, features, and advantages of the present invention will become apparent from the following description and the attached drawings.

DETAILED DESCRIPTION OF THE PREFERRED EMBODIMENT

Figure 1:
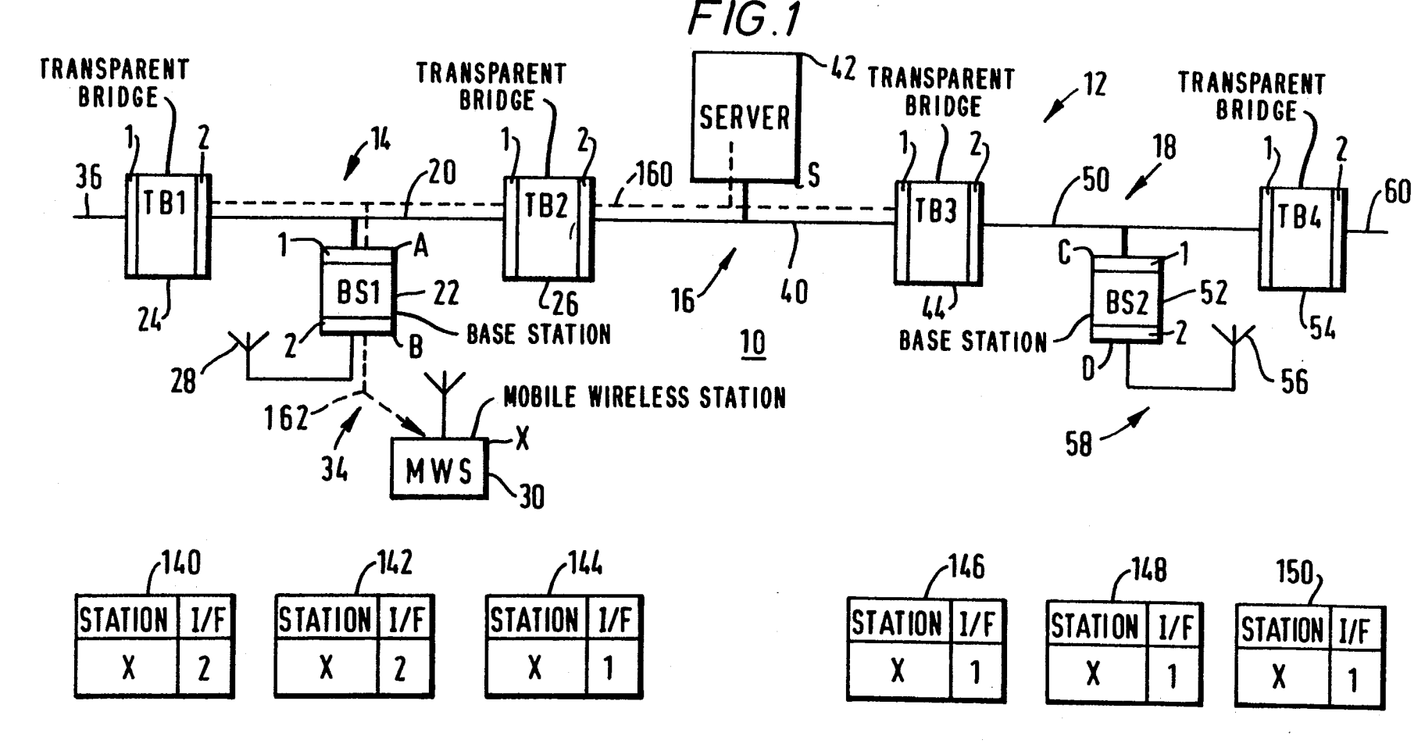
FIG. 1 shows a view of a block diagram of a wireless LAN system according to the invention.

Referring first to FIG. 1, there is shown a block diagram of a local area network (LAN) system 10 embodying the present invention. The LAN system 10 includes a backbone LAN 12, which is preferably a cable based LAN, but may alternatively be a wireless LAN. In the preferred embodiment, the backbone LAN 12 includes a plurality of LAN segments such as LAN segments 14, 16 and 18. The LAN segment 14 includes a cable 20 connecting to a base station BS1, referenced 22, a transparent bridge TB1, referenced 24 and a transparent bridge TB2, referenced 26. The base station BS1 has an antenna 28 for communication over a wireless communication channel with a mobile wireless station (MWS), referenced 30, having an antenna 32. The base station BS1 has a coverage area forming a wireless LAN segment 34, which may also be designated as a wireless cell 34 which defines the region within which the mobile wireless station 30 can communicate with the base station BS1. The base station BS1 has two interfaces identified by the numerals 1 and 2, the interface 1 connecting to the cable 20 of the LAN segment 14 and the interface 2 connecting to the wireless LAN segment 34.

The transparent bridge TB1 has two interfaces identified by the numerals 1 and 2, the interface 1 connecting to the cable 36 of a further LAN segment, and the interface 2 connecting to the cable 20 of the LAN segment 14. The transparent bridge TB2 has two interfaces identified by the numerals 1 and 2, the interface 1 connecting to the cable 20 of the LAN segment 14 and the interface 2 connecting to the LAN segment 16.

The LAN segment 16 includes a cable 40 which connects to the transparent bridge TB2, to a server 42 for the LAN system 10, and to a further transparent bridge TB3, referenced 44. The transparent bridge TB3 has two interfaces, identified by the numerals 1 and 2, the interface 1 connecting to the cable 40 of the LAN segment 16 and the interface 2 connecting to the LAN segment 18. The LAN segment 18 includes a cable 50 which connects to the transparent bridge TB3, to a base station BS2, referenced 52, and to a transparent bridge TB4, referenced 54. The base station BS2 has two interfaces identified by the numerals 1 and 2, the interface 1 connecting to the cable 50 and the interface 2 connecting to an antenna 56. The base station BS2 has a coverage area forming a wireless LAN segment 58, which may also be designated as a wireless cell 58. The transparent bridge TB4 has two interfaces, identified by the numerals 1 and 2, the interface 1 connecting to the cable 50 and the interface 2 connecting to the cable 60 of a further LAN segment.

Figure 2:
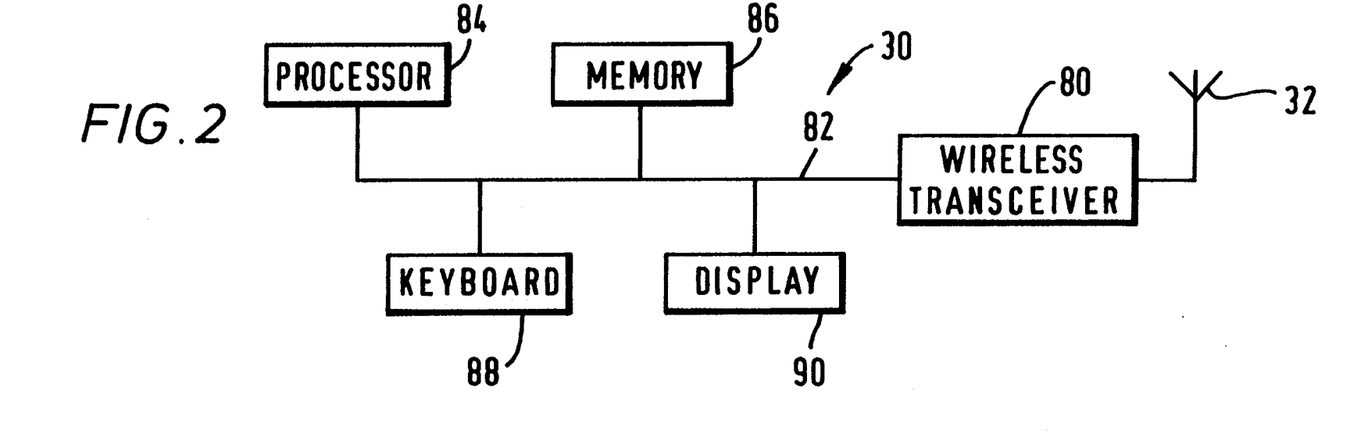
FIG. 2 shows a block diagram of a mobile wireless station utilized in the LAN system shown in FIG. 1.

Referring now to FIG. 2, there is shown a block diagram of the mobile wireless station 30. The station 30 includes a wireless transceiver 80 coupled to the antenna 32 and to a bus 82. The station 30 also includes, connected to the bus 82, a processor 84, a memory unit 86, and (optionally) a keyboard 88 and a display 90. Other devices such as a printer (not shown) may also be connected to the bus 82.

Figure 3:
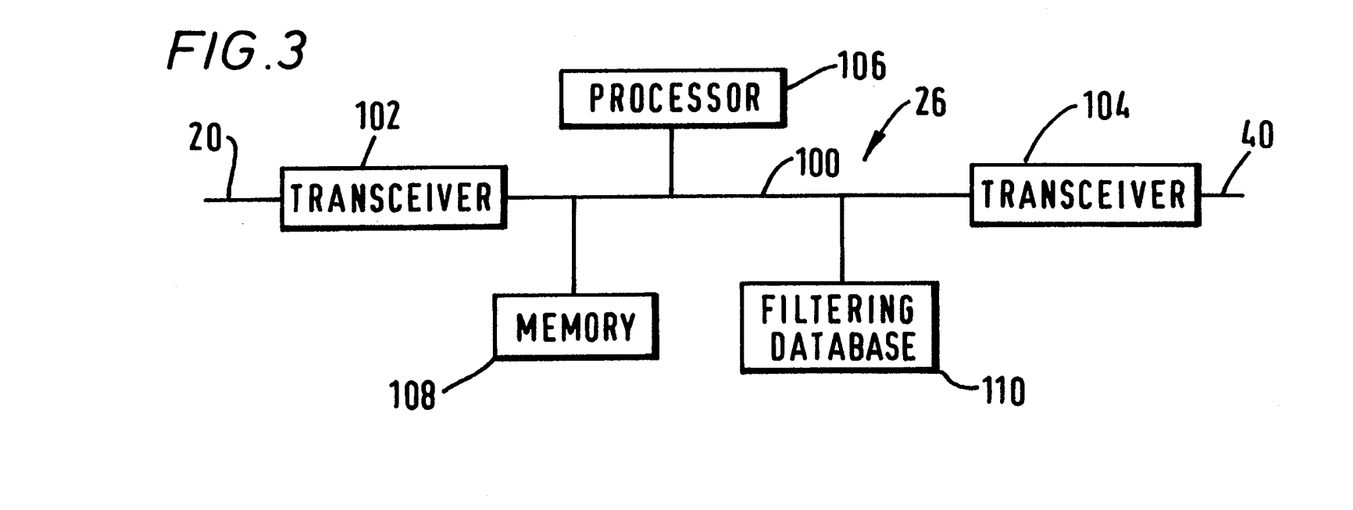
FIG. 3 shows a block diagram of a transparent bridge utilized in the LAN system shown in FIG. 1.

Referring to FIG. 3, there is shown a block diagram of the transparent bridge 26 (TB2), it being appreciated that the other transparent bridges 24, 44 and 54 shown in FIG. 1 are of identical construction to the bridge 26. The bridge 26 includes a bus 100 connected to respective transceivers 102 and 104 which are connected to the cables 20 and 40 respectively. Also connected to the bus 100 are a processor 106, a memory 108 and a filtering database 110, which is also essentially a memory device.

As will be appreciated by those skilled in the art, a transparent bridge such as the bridge 26 (FIG. 3) transfers messages between the networks, such as the LAN segments 14, 16 (FIG. 1) to which it is connected. A full description of transparent bridges will be found in IEEE Standard 802.1D. For the present purposes it is sufficient to appreciate that a transparent bridge includes a filtering database such as the filtering database 110 which contains a table of stations in the LAN system, specifying for each station in the table the particular interface of the bridge to which messages destined for that station are directed. Thus, messages received by the bridge are forwarded to the correct interface for onward transmission and filtered from all other interfaces of the transparent bridge. The filtering database 110 stores filtering information which is either explicitly configured by management action (static entries) or automatically entered by a learning process (dynamic entries). In accordance which the learning process for dynamic entries, the source address of each message received at an interface of the bridge is used to update the dynamic filtering database. In other words, the message path through a bridged LAN system is deduced at each transparent bridge by inspection of the source address of received messages, the interface on which the message was received being associated with the source address of the message.

Figure 4:
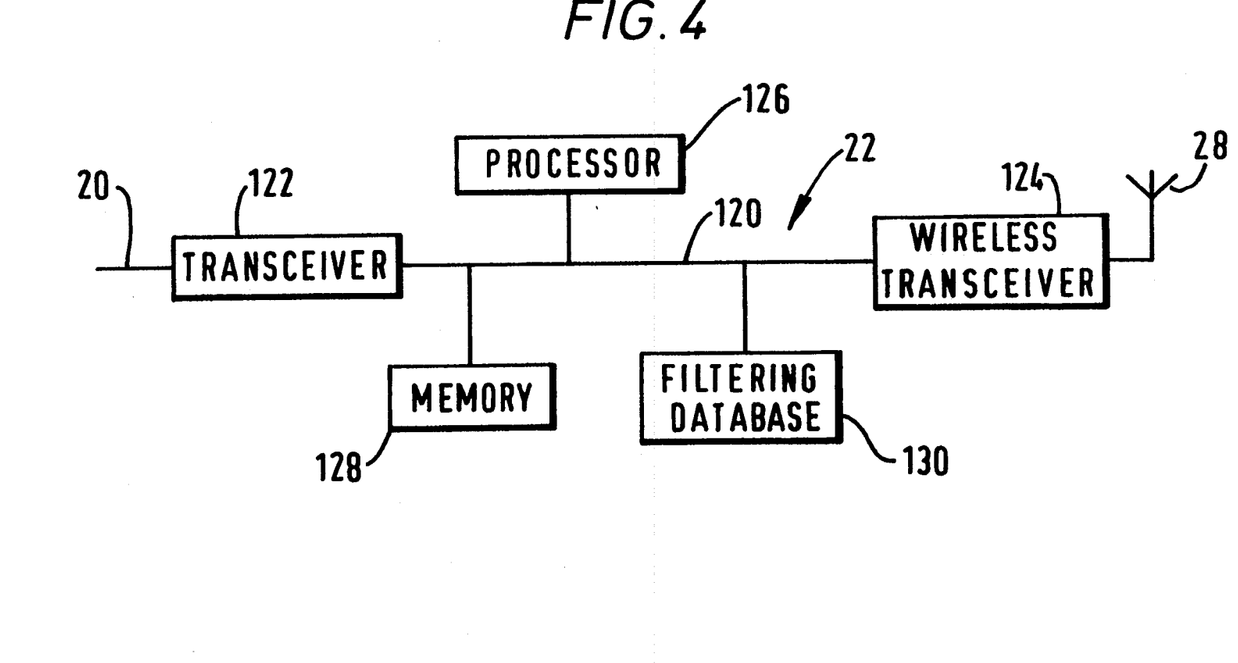
FIG. 4 shows a block diagram of a base station utilized in the LAN system shown in FIG. 1.

Referring to FIG. 4, there is shown a block diagram of the base station 22 (BS1), the base station 52 being of identical construction. The base station 22 includes a bus 120 which is connected to a transceiver 122 connected to the cable 20 of the LAN segment 14, and a wireless transceiver 124 connected to the antenna 28. Also connected to the bus 120 are a processor 126, a memory 128 and a filtering database 130. Thus, it will be appreciated that the base station 22 (and the base station 52) operates as a transparent bridge, utilizing a dynamic filtering database. Although the base stations 22 and 52 in general act as transparent bridges with a dynamic filtering database, it is also possible for messages to specifically address the base stations 22 and 52. Referring to FIG. 1 the base station 22 (BS1) has an address shown as A for messages arriving at its interface 1 and an address shown as B for the messages arriving at its interface 2. Similarly the base station 52 (BS2) has an address shown as C for messages arriving at its interface 1 and an address shown as D for messages arriving at its interface 2.

Also shown in FIG. 1 are portions of the filtering databases for the transparent bridges and the base stations. Thus filtering database portion 140 shows that the station having address X (the mobile wireless station 30) is associated with interface (I/F) 2 of the transparent bridge 24 (TB1). The filtering database portions 142, 144, 146, 148 and 150 show the respective interfaces (I/F) of the base station 22 (BS1), transparent bridge 26 (TB2), transparent bridge 44 (TB3), base station 52 (BS2) and transparent bridge 54 (TB4) with which the mobile wireless station 30, having address X, is associated. The dashed line 160 shows the path by which a message from the server 42 (which has the address S) reaches the mobile wireless station 30, such message having the destination address X of the mobile wireless station 30. It is seen that such a message is forwarded through the transparent bridge 26 and the base station 22 where it is transmitted over the wireless communication channel to the mobile station 30 as shown by the dashed arrow path 162. However, such message is not forwarded through either of the transparent bridges 24, 44.

Figure 5:
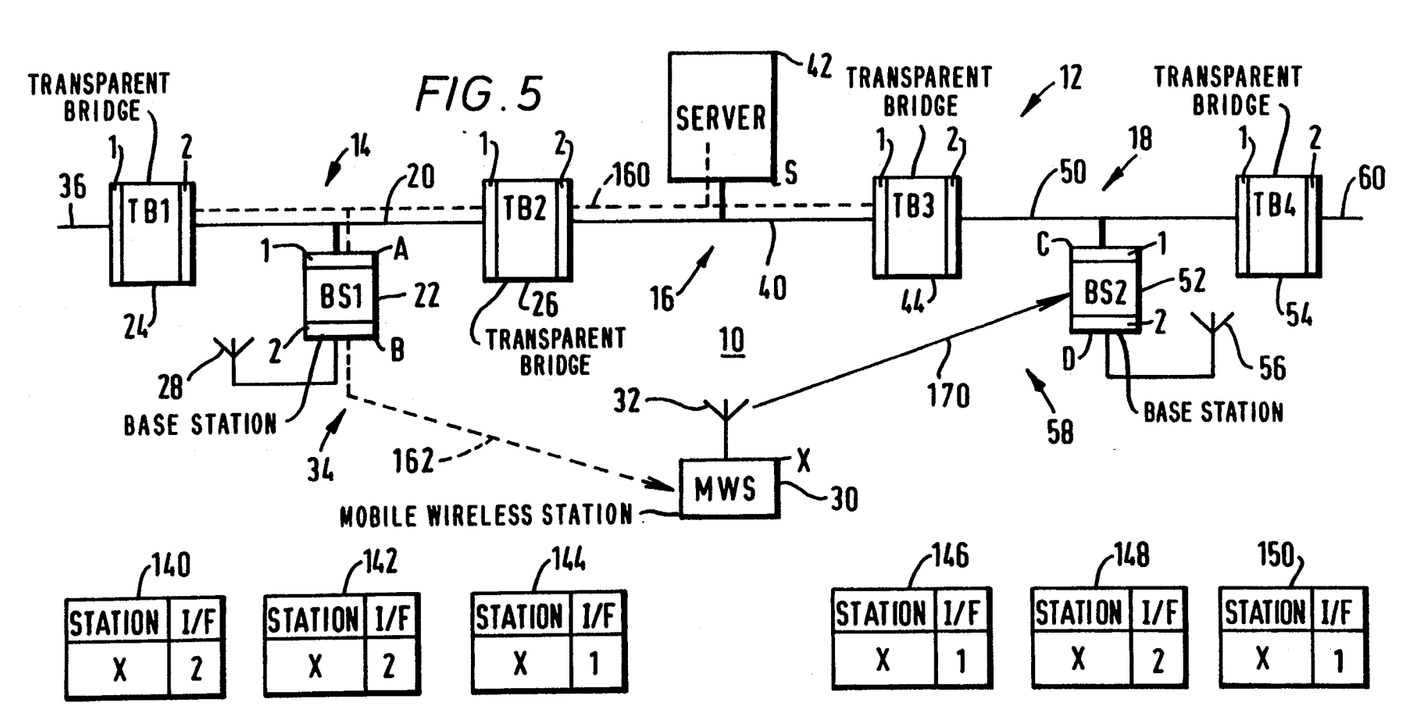
FIG. 5 shows the system of FIG. 1 following a decision at the mobile station to hand over communication to a different base station.

Referring now to FIG. 5 it will be assumed that the mobile wireless station 30 has moved to the position shown in FIG. 5 at which a handover decision has been taken at the mobile wireless station 30 to hand over communications from the base station 22 to a new base station assumed to be the base station 52 (BS2). The manner in which such handover decision is made is not important for the present invention, will not be described in detail. Briefly, such decision may result from a decreased acceptability of transmissions from the base station 22 followed by a determination that the base station 52, which may be selected from a plurality of available new base stations, is determined as the new base station. In this connection, it should be understood that messages transmitted by the mobile wireless station 30 are normally effectively received by only one base station. This may be achieved, for example, by incorporating a network ID (NWID) portion in each message transmitted by the mobile station 30, which identifies the particular cell or network, such as the cell 34, for example, in which the mobile station 30 is located. Alternatively, different frequency channels for the respective cells such as 34, 58 may be used.

Figure 6:
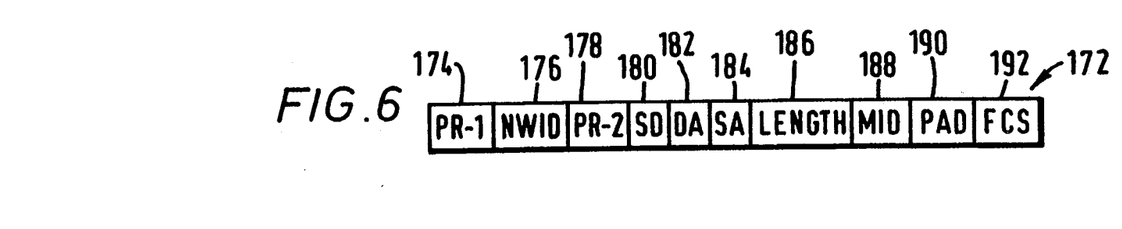
FIG. 6 shows the structure of a handover request message.

Following such handover decision, the mobile wireless station 30 transmits a handover request message (HRM), in the new cell 58 to be received by the new base station 52, as indicated by the arrow 170. Referring briefly to FIG. 6, the format of the handover request message 172 is shown. The handover request message 172 commences with a first preamble portion (PR-1) 174, followed by a network ID (NWID) portion 176, a second preamble portion (PR-2) 178, a start delimiter (SD) portion 180, a destination address (DA) portion 182, a source address (SA) portion 184, a length portion 186, a message ID portion 188, which identifies the message 172 as a handover request message, a pad portion 190 and a check portion (FCS) 192. It will be appreciated that the handover request message 172 has the old base station address A as the destination address (DA) and the mobile wireless station address X is the source address (SA).

Referring again to FIG. 5, it is assumed that the handover request message 172 has been received at the base station 52 (BS2). By utilizing the learning process referred to hereinabove, the dynamic filtering database (corresponding to database 130, FIG. 4) in the base station 52 is updated as can be gathered from the database portion 148 where it is seen the mobile station X has its interface identification changed from interface 1 to interface 2. It will be noted that messages from the server 42 to the mobile station 30 continue to follow the path shown by dashed line 160 and arrow 162. However, messages from the mobile station 30 to the server 42, will follow a path via the new base station 52 and transparent bridge 44.

Figure 7:
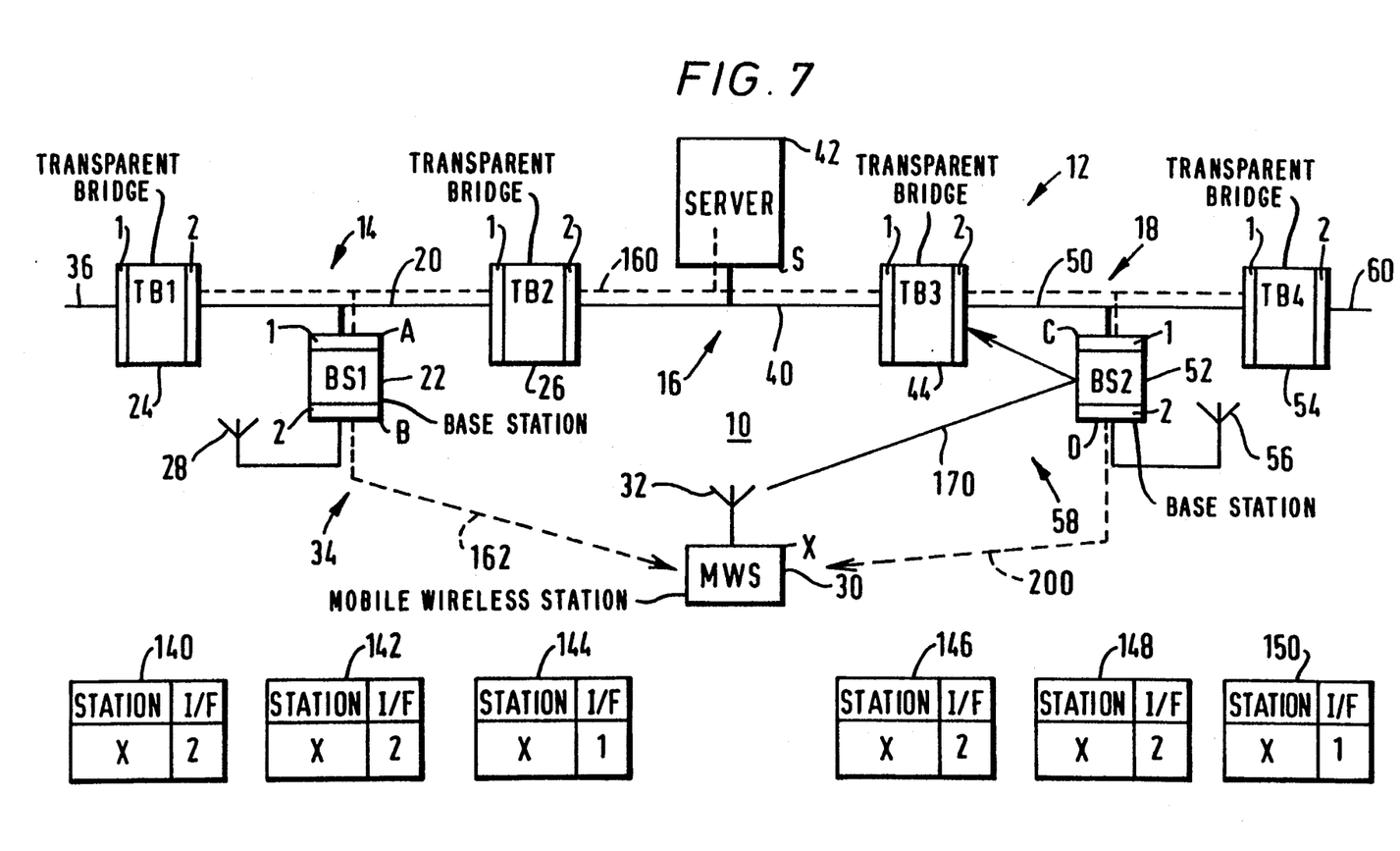
FIGS. 7 through 9 shows the progress of the handover request message through the LAN system of FIG. 1.

Referring now to FIG. 7, it is assumed that the handover request message 172 (FIG. 6) has been received at the transparent bridge 44 (TB3). The dynamic filtering database in TB3 is updated as can be gathered from the database portion 146, where it is seen that the station X has its interface identification changed from interface 1 to interface 2. Messages from the server 42 to the mobile wireless station 30 will now follow two paths, as shown by the dashed arrows 162, 200. This may result in duplicate messages from the server 42, or other devices (not shown) located in the backbone LAN 12 being received at the mobile wireless station 30. However a received duplicate message is ignored by the mobile wireless station 30.

It should be understood that in a modified embodiment, as soon as a handover decision is made at the mobile wireless station 30, the station is controlled to receive messages from the new base station 52 only and not from the old base station 22. This avoids message duplication but may result in the loss of messages destined for the mobile station 30. However, such loss can be corrected using a higher level protocol, resulting in the retransmission of a lost message.

Figure 8:
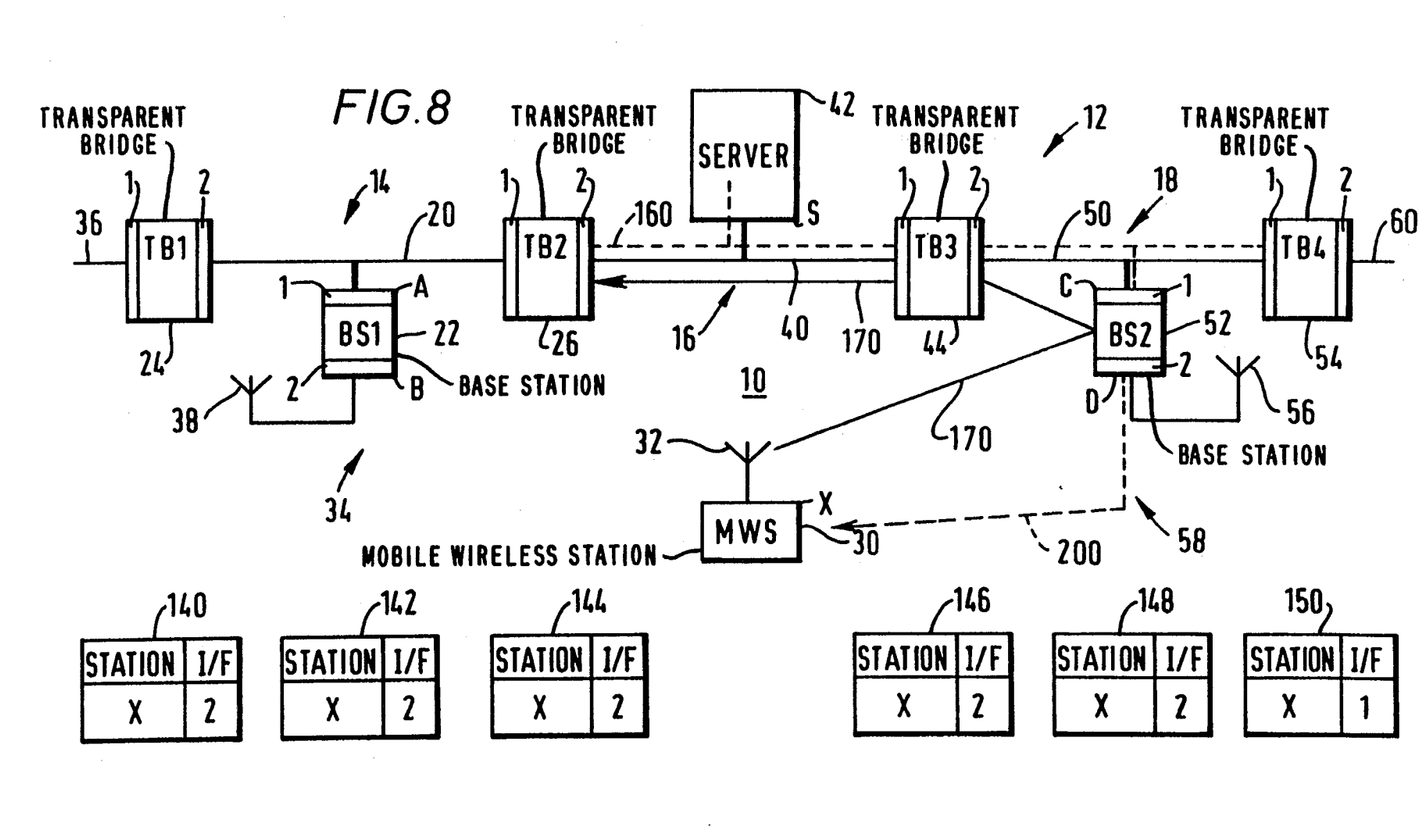

Referring now to FIG. 8, the solid arrow 170 indicates that the handover request message 172 (FIG. 6) has been received at the transparent bridge 26 (TB2). The dynamic filtering database in TB2 is updated, as can be gathered from the database portion 144, where it is seen that the mobile station X has its interface identification changed from interface 1 to interface 2. Messages from the server 42 to the mobile wireless station now follow only the path shown by the dashed arrow 200, and are not received by the old base station 22.

Figure 9:
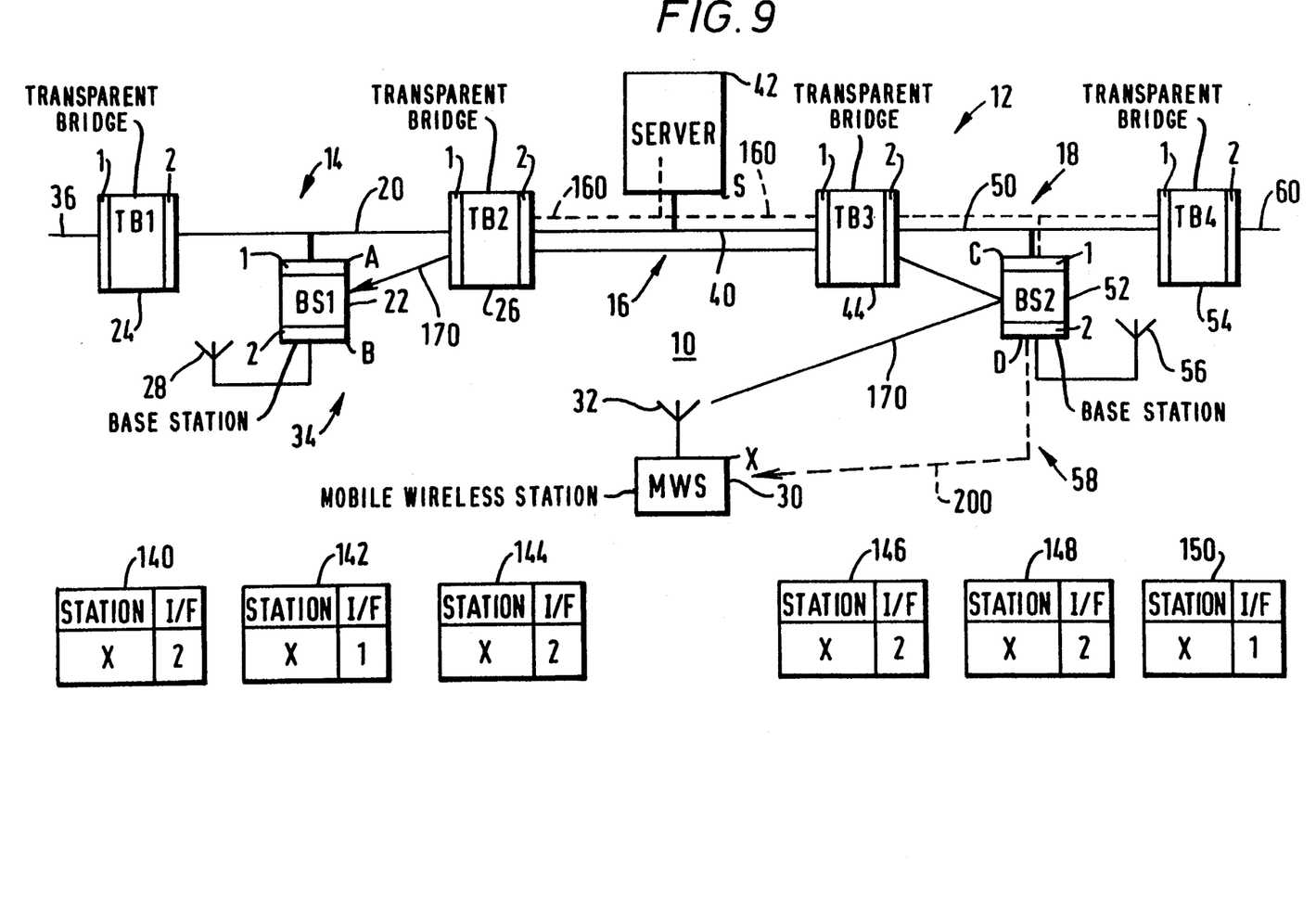

Referring now to FIG. 9, the solid arrow 170 indicates that the handover request message 172 (FIG. 6) has been received at the old base station 22. The dynamic filtering database in the base station 22 is updated, as can be gathered from the database portion 142, where it is seen that the mobile station X has its interface identification changed from interface 2 to interface 1. All transparent bridges and base stations involved in the handover now reflect the required interface identification for the mobile wireless station 30 in its new location, communicating with the new base station 52. Messages from the server 42 follow the path indicated by the line 160 and arrow 200.

Figure 10:
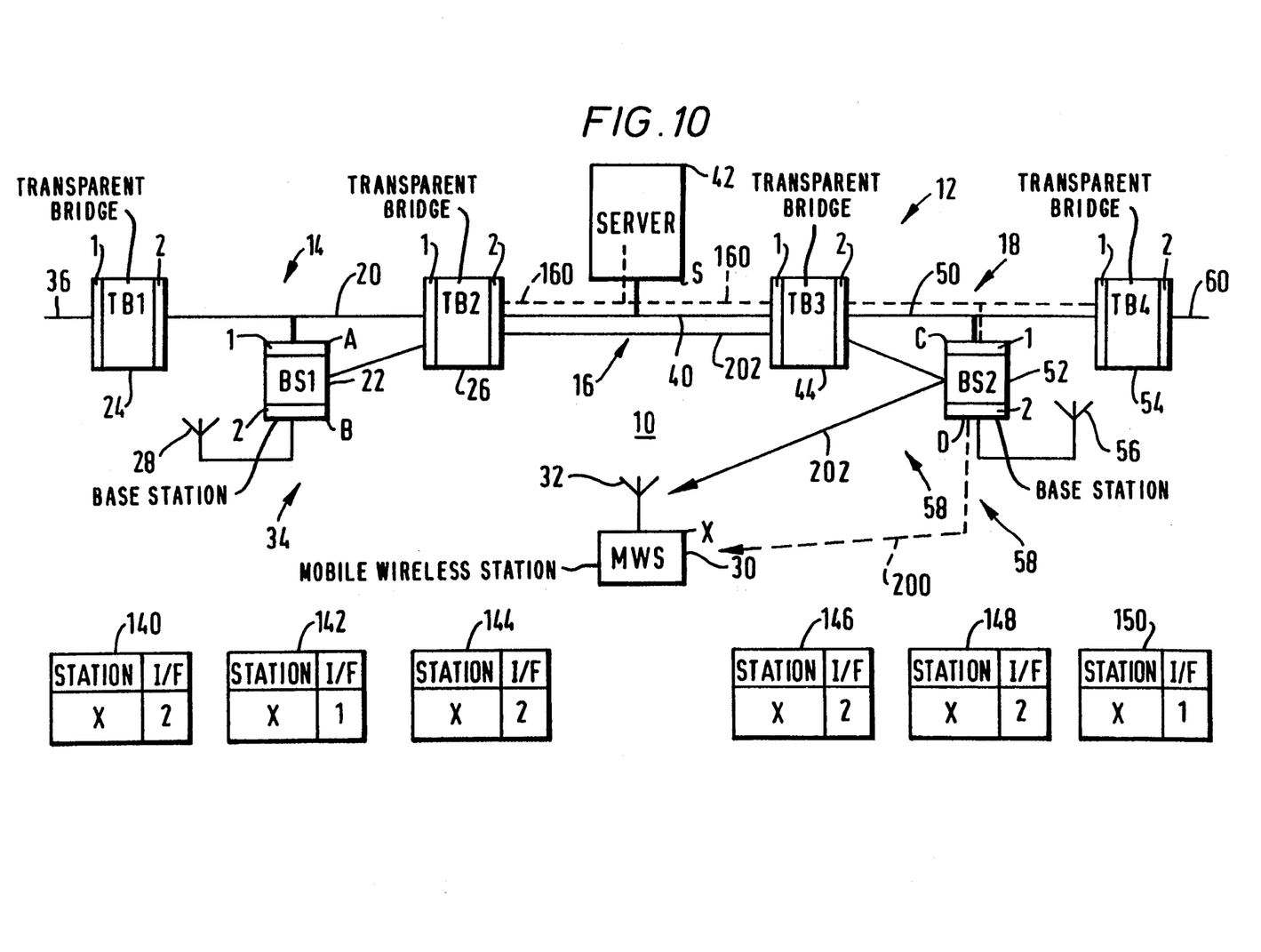
FIG. 10 shows the progress of a handover complete message through the LAN system of FIG. 1.

Following the receipt of the handover request message 172 (FIG. 6), the old base station 22 now transmits a handover complete message, with destination address X (the mobile wireless station 30), as shown by the solid arrow 202 in FIG. 10. When the handover complete message is received by the mobile wireless station 30, the mobile wireless station 30 discontinues reception of any messages from the old base station 22. The handover complete message does not cause the updating of any of the dynamic filtering databases. Of course, in the alternative embodiment discussed hereinabove, the transmission of such handover complete message may be omitted, since the mobile wireless station 30 has already been controlled to cease reception of messages from the old base station 22 at the time the handover decision was made.

Figure 11:
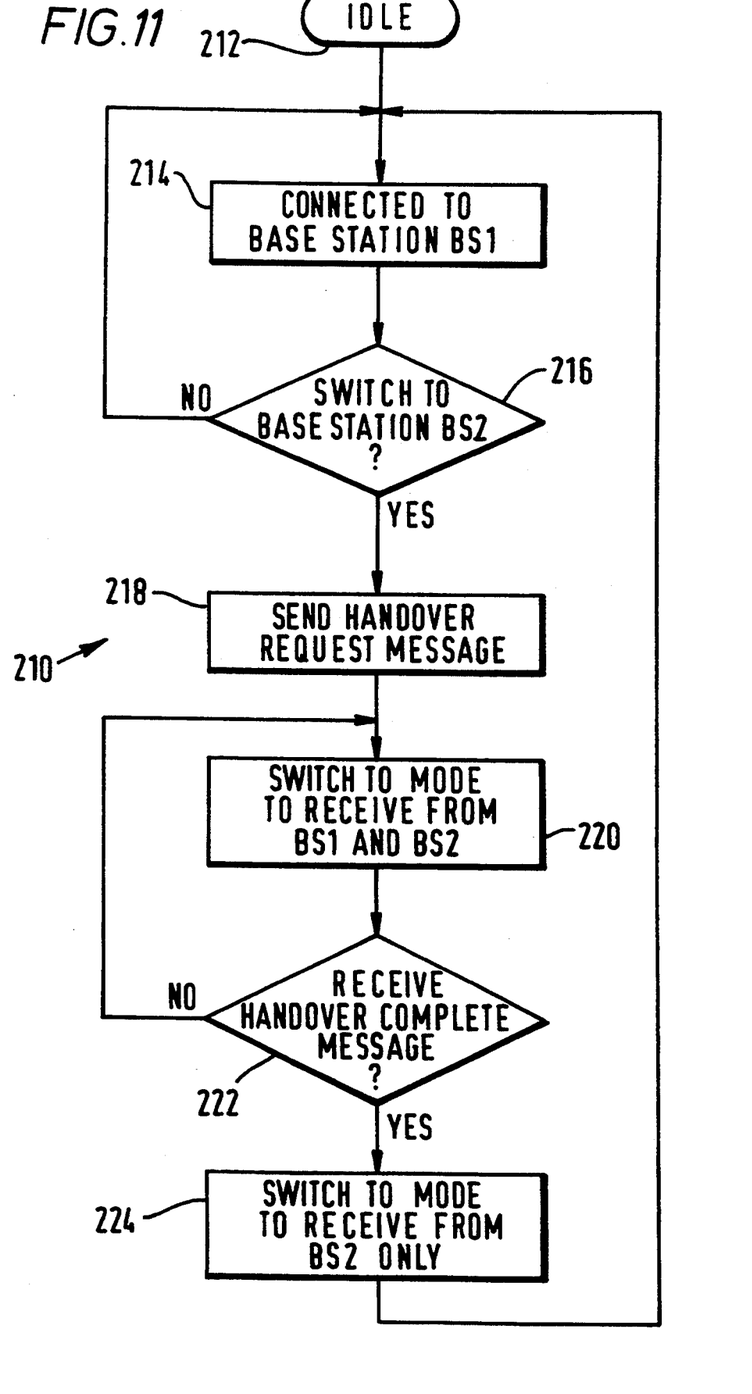
FIGS. 11 and 12 are flowcharts illustrative of the operation of the mobile wireless station during a handover procedure.

Referring now to FIG. 11 there is shown a flowchart 210 for the handover procedure at the mobile wireless station 30. From an initial idle state (block 212), the flowchart proceeds to block 214 which shows the mobile station 30 in communication with the base station BS1. If a decision is made to handover communication to the base station BS2 (block 216), the flowchart proceeds to block 218, and a handover request message is sent via the backbone LAN 12, as fully described hereinabove, to update the dynamic filtering databases in the base stations 22, 52 and transparent bridges 26, 44. Also, the mobile wireless station 30 switches to a mode to receive messages from both BS1 and BS2 (block 220). The flowchart proceeds to block 222 where the mobile station checks whether a handover complete message is received. When such handover complete message has been received, the mobile station switches to receive messages from the new base station BS2 only (block 224).

Figure 12:
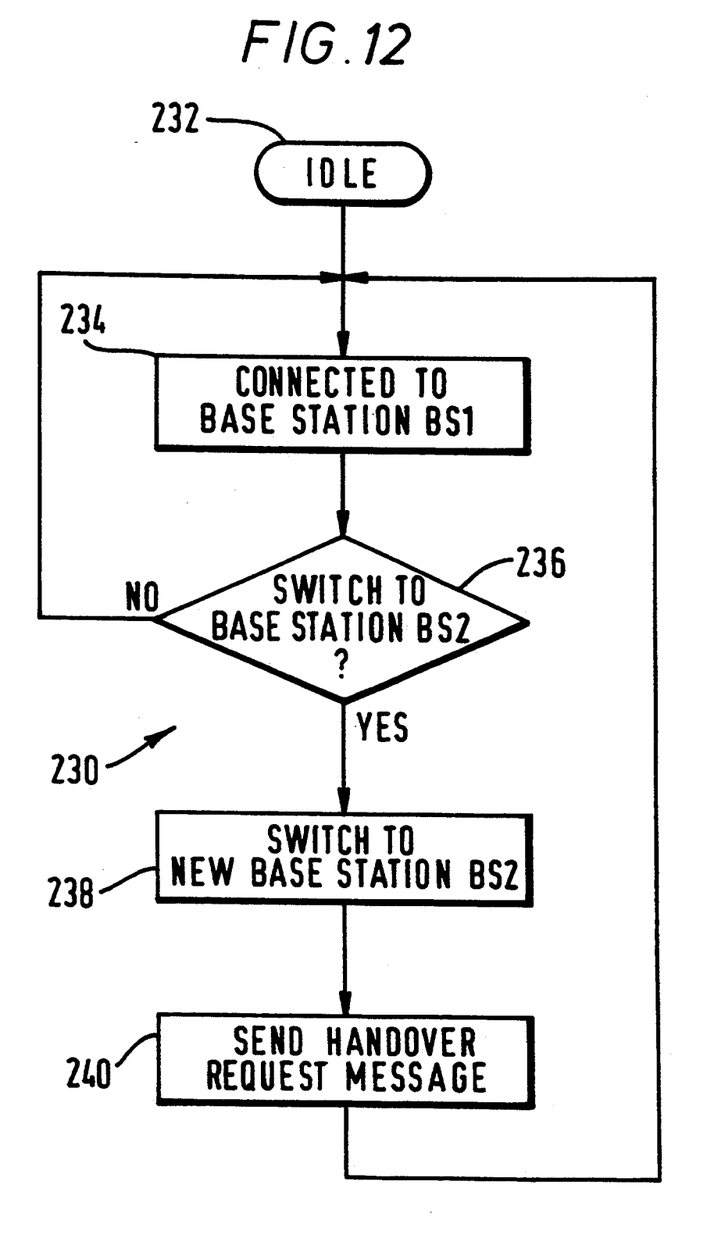

Referring finally to FIG. 12, there is shown a flowchart 230 illustrating the operation of the mobile wireless station 30 in the alternative embodiment discussed hereinabove. Starting from an initial idle state (block 232) the flowchart proceeds to block 234, illustrating operation of the mobile wireless station 30 in communication with base station BS1. If a decision is made to switch to a new base station BS2 (block 236), the flowchart proceeds to switch immediately to communicate with the new base station BS2 and ceases to communicate with the old base station BS1. A handover request message is then sent (block 240) over the backbone LAN to the old base station to update the dynamic filtering database of the base stations 22, 52 and transparent bridges 26, 44, as described in detail hereinabove.

Thus there has been described a wireless LAN system which enables handover of a mobile station from one base station to another base station to be achieved in a simple manner by utilizing a transparent bridge dynamic filtering database updating function. A further advantage is that transparent bridges in the backbone LAN can also be updated in a simple, automatic manner.

What is claimed is:

1. A local area network system comprising:
 a backbone LAN (12);
 a plurality of addressable base stations (22, 52) for respective wireless cells (34, 58), each base station (22) having a first interface adapted to communicate with said backbone LAN (12) and a second interface adapted to communicate with a mobile wireless station (30);
 each said base station (22) being adapted to operate as a transparent bridge having a dynamic filtering database for restricting communications between said backbone LAN (12) and said mobile wireless station (30);
 each said base station (22) operating in response to a handover decision at said mobile wireless station (30) to hand over communications from a first cell (34) associated with a first base station (22) to a second cell (58) associated with a second base station (52), said mobile wireless station (30) being adapted to transmit via said second base station (52) and backbone LAN (12), a handover request message (172) having the address of said mobile wireless station (30) as a source address and the address of said first base station (22) as a destination address, thereby updating the dynamic filtering databases of said first and second base stations (22, 52) as to the location of said mobile wireless station (30); and
 at least one transparent bridge (26, 44) having a dynamic filtering database for restricting communications between said base stations (22, 52);
 each said transparent bridge being adapted to be updated by said handover request message (172).

2. A local area network system according to claim 1, wherein said backbone LAN (12) comprises a wired cable LAN.

3. A local area network system according to claim 2, wherein said handover decision is effective to cause said mobile wireless station (30) to terminate communication with said first base station (22).

4. A local area network system according to claim 2, wherein said first base station (22) is responsive to receipt of said handover request message to transmit over said backbone LAN (12) to said mobile wireless station (30) a handover complete message which is effective to cause said mobile wireless station (30) to cease communicating with said first base station (22).

5. A local area network system according to claim 1, wherein said handover decision is effective to cause said mobile wireless station (30) to terminate communication with said first base station (22).

6. A local area network system according to claim 1, wherein said first base station (22) is responsive to receipt of said handover request message to transmit over said backbone LAN (12) to said mobile wireless station (30) a handover complete message which is effective to cause said mobile wireless station (30) to cease communicating with said first base station (22).

7. A method of operating a local area network system including a backbone LAN (12) having a plurality of addressable base stations (22, 52) adapted to communicate with a mobile wireless station (30), said method comprising the steps of:
 providing a dynamic filtering database in each one of said base stations (22, 52) identifying the location of said mobile wireless station (30) relative to the base station;
 deciding at said mobile wireless station (30) to hand over communications from a first base station (22) to a second base station (52);
 transmitting from said mobile wireless station (30) a handover request message (172) to said first base station (22) via said second base station (52) and said backbone LAN (12);
 updating the dynamic filtering databases in said first and second base stations (22, 52) in response to receipt of said handover request message (172);
 providing at least one transparent bridge (26, 44) in said backbone LAN (12), having a dynamic filtering database;

forwarding said handover request message (172) via said transparent bridge (26, 44); and updating the dynamic filtering database of said transparent bridge (26, 44) in response to said handover request message (172).

8. A method according to claim 7, further comprising the step of:

switching communication of said mobile wireless station (30) from said first base station (22) to said second base station (52) following said deciding step.

9. A method according to claim 7, further comprising the steps of:

transmitting from said first base station (22) a handover complete message via said backbone LAN (12) and said second base station (52) to said mobile wireless station (30) following receipt by said first base station (22) of said handover request message (172); and terminating communication of said mobile wireless station (30) with said first base station (22) in response to receipt of said handover complete message at said mobile wireless station (30).

* * * * *